United States Patent
Sugeno (10) Patent No.: US 11,139,524 B2
(45) Date of Patent: Oct. 5, 2021

(54) LID FOR CELL TRAY, LID-ATTACHED CELL TRAY, AND METHOD FOR MANUFACTURING BATTERY

(71) Applicant: MURATA MANUFACTURING CO., LTD., Kyoto (JP)

(72) Inventor: Toraji Sugeno, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/508,542

(22) Filed: Jul. 11, 2019

(65) Prior Publication Data

US 2019/0334143 A1 Oct. 31, 2019

Related U.S. Application Data

(63) Continuation of application No. PCT/JP2017/034680, filed on Sep. 26, 2017.

(30) Foreign Application Priority Data

Jan. 13, 2017 (JP) .............................. JP2017-004226

(51) Int. Cl.
*H01M 50/20* (2021.01)
*A62C 3/16* (2006.01)
*H01M 50/209* (2021.01)

(52) U.S. Cl.
CPC ............... *H01M 50/20* (2021.01); *A62C 3/16* (2013.01); *H01M 50/209* (2021.01)

(58) Field of Classification Search
None
See application file for complete search history.

(56) References Cited

U.S. PATENT DOCUMENTS

2007/0164711 A1 7/2007 Kim et al.
2013/0264077 A1 10/2013 Jung

FOREIGN PATENT DOCUMENTS

| CN | 103270643 | | 8/2013 |
|---|---|---|---|
| CN | 205488293 | | 8/2016 |
| JP | 2000030739 | A | 1/2000 |
| JP | 2007200880 | A | 8/2007 |
| JP | 2011254906 | A | 12/2011 |
| JP | 2014033824 | A | 2/2014 |
| JP | 2014506384 | A | 3/2014 |
| JP | 2014090782 | A | 5/2014 |
| JP | 2015162285 | A | 9/2015 |
| WO | WO2005/076387 | * | 8/2005 |

OTHER PUBLICATIONS

International Search Report for Application No. PCT/JP2017/034680, dated Dec. 5, 2017.
Chinese Office Action dated Jul. 5, 2021 in corresponding Chinese Application No. 201780083355.3.

* cited by examiner

*Primary Examiner* — Sarah A. Slifka
(74) *Attorney, Agent, or Firm* — K&L Gates LLP (57) ABSTRACT

A lid for a cell tray is provided. The lid includes a cover configured to cover a battery accommodated in the cell tray, and a fire extinguishing liquid. The cover has plate-shaped cover plates with a gap, and the fire extinguishing liquid is configured to be sealed in a package disposed in the gap. The cover plates are configured to have a plurality of opening holes.

17 Claims, 5 Drawing Sheets

| | NUMBER OF BATTERIES CATCHING FIRE | TIME TO SPONTANEOUS FIRE EXTINGUISHMENT | FIRE SPREAD |
|---|---|---|---|
| EXAMPLE 1 | 0 | 5 s | NOT CAUSED |
| EXAMPLE 2 | 0 | 6 s | NOT CAUSED |
| EXAMPLE 3 | 0 | 8 s | NOT CAUSED |
| EXAMPLE 4 | 0 | 5 s | NOT CAUSED |
| EXAMPLE 5 | 0 | 5 s | NOT CAUSED |
| EXAMPLE 6 | 0 | 8 s | NOT CAUSED |
| EXAMPLE 7 | 0 | 7 s | NOT CAUSED |
| COMPARATIVE EXAMPLE 1 | 706 | NOT AVAILABLE | CAUSED |
| COMPARATIVE EXAMPLE 2 | 510 | NOT AVAILABLE | CAUSED |
| COMPARATIVE EXAMPLE 3 | 458 | NOT AVAILABLE | CAUSED |
| COMPARATIVE EXAMPLE 4 | 288 | NOT AVAILABLE | CAUSED |
| COMPARATIVE EXAMPLE 5 | 385 | NOT AVAILABLE | CAUSED |

|  | AMOUNT OF WATER (g/m2) | TIME TO FIRE EXTINGUISHMENT (s) | BATTERY TEMPERATURE Max (°C) |
|---|---|---|---|
| EXPERIMENTAL EXAMPLE 1 (= EXPERIMENTAL EXAMPLE 2) | 868 | 15 | 512 |
| EXPERIMENTAL EXAMPLE 2 | 1736 | 5 | 588 |
| EXPERIMENTAL EXAMPLE 3 | 2604 | 4 | 526 |
| EXPERIMENTAL EXAMPLE 4 | 3472 | 6 | 342 |
| EXPERIMENTAL EXAMPLE 5 | 0 | 28 | 689 |

LID FOR CELL TRAY, LID-ATTACHED CELL TRAY, AND METHOD FOR MANUFACTURING BATTERY

CROSS REFERENCE TO RELATED APPLICATIONS

The present application is a continuation of PCT patent application no. PCT/JP2017/034680, filed on Sep. 26, 2017, which claims priority to Japanese patent application no. JP2017-004226 filed on Jan. 13, 2017, the entire contents of which are being incorporated herein by reference.

BACKGROUND

The present technology generally relates to a lid for a cell tray and a lid-attached cell tray, which are used for battery manufacture, and a method for manufacturing a battery with the use of the lid for a cell tray.

In the conventional technology, lithium ion secondary batteries and the like have been used for power supplies for various electronic devices such as mobile terminals, personal computers (PCs), and electric vehicles. In this regard, the batteries are manufactured through a testing step of checking the performance (quality) of the batteries after a battery assembling step.

In this battery testing step, the battery assembled in the assembling step is charged, thereafter, the voltage, the impedance, the temperature, and the like are measured, defective batteries are removed, and normal batteries are discharged, and then positioned as finished products. In addition, in this battery testing step, a large number of batteries is loaded on a conveyor and transferred, and continuously supplied to respective steps of charging, measuring, and discharging. For the transfer of the batteries, a cell tray that is capable of housing and transferring a large number of batteries at a time is used in consideration of mass productivity.

When a metal falling object comes into contact with the cell tray with the battery housed in the cell tray, the battery may suffer from an external short circuit, thereby generating heat. Although it is not a possibility in normal use condition, in a special test condition, as an extremely rare case, the battery may generate heat or ignite, thereby causing surrounding batteries to catch fire. In order to prevent such an inconvenience, the batteries housed in the cell tray are covered with a cover plate. Conventionally, sponge plates, mica plates, and the like have been used as the cover plate.

SUMMARY

The present technology generally relates to a lid for a cell tray and a lid-attached cell tray, which are used for battery manufacture, and a method for manufacturing a battery with the use of the lid for a cell tray.

The conventional cell trays and cover plates are merely adapted to house a large number of batteries and prevent batteries from being externally short-circuited due to falling objects from above, and not configured in consideration of, in particular, prevention of fire caught by battery heat generation in the cell tray.

Therefore, the present technology has been achieved in view of such circumstances, and an object of the technology is to provide a lid for a cell tray, which is capable of keeping surrounding batteries from catching fire in a case in which a battery causes heat generation or ignition.

According to an embodiment of the present technology, a lid for a cell tray is provided. The lid includes a cover configured to cover a battery accommodated in the cell tray, and a fire extinguishing liquid.

According to an embodiment of the present technology, a lid-attached cell tray is provided. The lid-attached cell tray includes a cell tray configured to accommodate a plurality of batteries and a lid for a cell tray, wherein the lid includes a cover configured to cover the batteries accommodated in the cell tray, and a fire extinguishing liquid.

According to an embodiment of the present technology, a method for manufacturing a battery is provided. The method includes the steps of: assembling the battery; accommodating the battery in a cell tray; charging and discharging the battery; covering the battery accommodated in the cell tray with a lid for the cell tray, wherein the lid includes a cover configured to cover the battery accommodated in the cell tray and a fire extinguishing liquid; and in a case that the battery accommodated in the cell tray is ignited, the fire extinguishing liquid is released to the ignited battery.

According to the present technology, a lid for a cell tray can be provided, which is capable of keeping surrounding batteries from catching fire in a case in which a battery causes heat generation or ignition.

It should be understood that the effects described herein are not necessarily to be considered limited, and other suitable properties relating to the present technology may be realized and as further described.

BRIEF DESCRIPTION OF THE FIGURES

FIG. 2(a)-FIG. 2(d) are schematic diagrams illustrating a configuration example of a lid for a cell tray according to an embodiment of the present technology, where

FIG. 6(a)-FIG. 6(c) are schematic diagrams illustrating a configuration example of a lid for a cell tray according to an embodiment of the present technology, where FIG. 6(a) is a plan view of the lid, FIG. 6(b) is a cross-sectional view of the lid.

FIG. 7(a)-FIG. 7(c) are schematic diagrams illustrating a configuration example of a lid for a cell tray according to an embodiment of the present technology, where

DETAILED DESCRIPTION

As described herein, the present disclosure will be described based on examples with reference to the drawings, but the present disclosure is not to be considered limited to the examples, and various numerical values and materials in the examples are considered by way of example.

A configuration example of a lid-attached cell tray according to a first embodiment of the present technology will be described with reference to FIG. 1.

Figure 1:
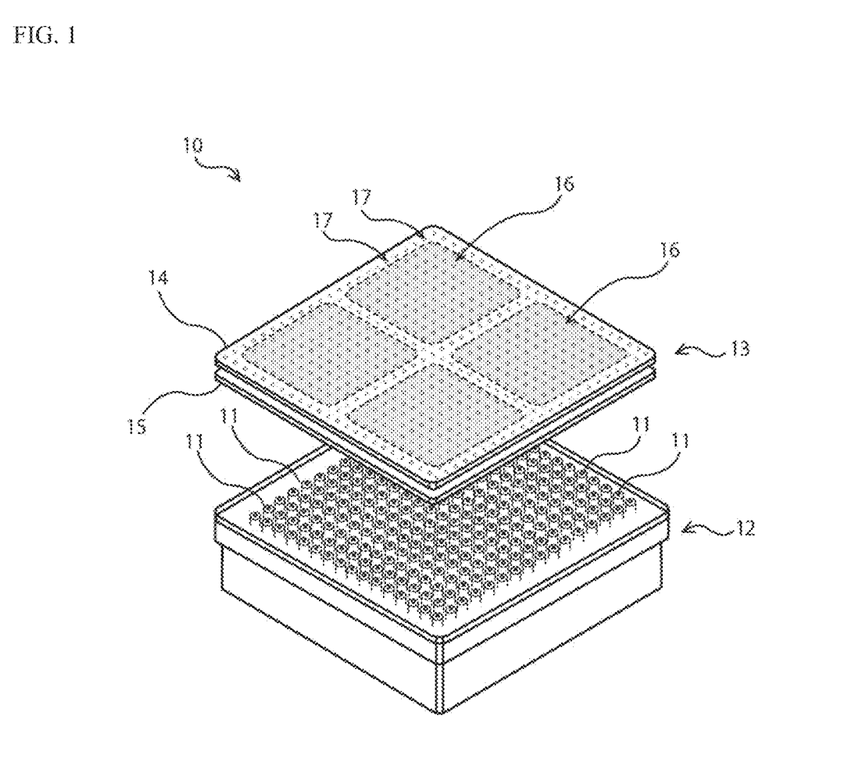
FIG. 1 is a perspective view illustrating a configuration example of a lid-attached cell tray according to an embodiment of the present technology.

FIG. 1 is a perspective view illustrating a configuration example of a lid-attached cell tray 10 according to the first embodiment of the present technology. As shown in FIG. 1, the lid-attached cell tray 10 includes a cell tray 12 for housing a secondary battery 11 such as a lithium ion battery, and a lid 13 for a cell tray for covering the top of a battery housed in the cell tray 12.

As an example, a 18650 size cylindrical battery is used as the secondary battery 11 according to the present embodiment. The cell tray 12 according to the present embodiment has a rectangular parallelepiped shape with a substantially square planar shape, and includes a housing unit capable of housing a plurality of secondary batteries 11.

The cell tray 12 according to the present embodiment is formed so as to be capable of housing 256 secondary batteries 11 in total: 16 rows in the vertical direction and 16 rows in the horizontal direction.

The lid 13 for a cell tray includes an upper cover plate 14 and a lower cover plate 15, which serve as covers for covering the top of the batteries housed in the cell tray 12. The upper cover plate 14 and the lower cover plate 15 are plate-shaped cover plates with a gap therebetween, and a water bag 16 containing water, which is a fire extinguishing liquid for extinguishing a fire source, is disposed in the gap. In addition, the upper cover plate 14 and the lower cover plate 15 each have a plurality of opening holes 17 arranged at regular intervals.

The secondary battery 11 for use in power supplies of various electronic devices such as mobile terminals, a personal computers (PCs), and electric vehicles is manufactured through a testing step of checking the performance (quality) of the battery after a step of assembling the secondary battery 11. In this testing step, the battery assembled in the assembling step is charged, thereafter, the voltage, the impedance, the temperature, and the like are measured, and in the case of a defective secondary battery 11, this battery 11 is removed, whereas in the case of a normal secondary battery 11, the battery 11 is discharged, and then positioned as a finished product. In this testing step, a large number of secondary batteries 11 is loaded on a conveyor and transferred, and continuously supplied to respective steps of charging, measuring, and discharging. Thus, the lid-attached cell tray 10 is, in consideration of mass productivity, used to house a large number of secondary batteries 11 in the cell tray 12 and transfer the secondary batteries 11 at a time.

Figure 2:
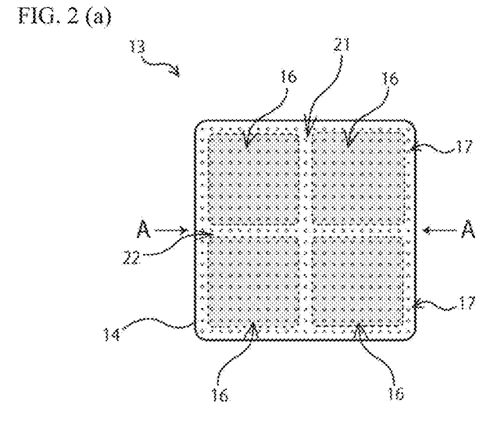
FIG. 2(a) is a plan view of the lid.
FIG. 2(b) is a cross-sectional view of a lid-attached cell tray.
FIG. 2(c) is an enlarged view of an end of the lid.
FIG. 2(d) is a plan view showing the positional relationship between a water bag in the lid and a battery.

FIG. 2 is a schematic diagram illustrating a configuration example of the lid 13 for a cell tray, which is used for the lid-attached cell tray 10 according to the first embodiment of the present technology. FIG. 2(a) is a plan view of the lid 13 for a cell tray, FIG. 2(b) is a cross-sectional view of the cell tray 12 and the lid 13 for a cell tray along the line A-A, FIG. 2(c) is an enlarged view of an end of the lid 13 for a cell tray in a frame B, and FIG. 2(d) is a plan view showing the positional relationship between a water bag and a battery in the lid 13 for a cell tray. A configuration example of the lid 13 for a cell tray will be described with reference to FIGS. 2(a) to 2(d).

When a metal falling object comes into contact with the cell tray with the battery housed in the cell tray, the battery may suffer from an external short circuit, thereby generating heat. In addition, although it is not a possibility in normal use condition, in a special test condition, as an extremely rare case, the battery may generate heat or ignite, thereby causing surrounding batteries to catch fire. In order to prevent such an inconvenience, the lid 13 for a cell tray is used to cover the batteries housed in the cell tray 12.

As shown in FIGS. 2(a) and 2(b), the water bag 16 containing water W which is a fire extinguishing liquid for extinguishing a fire source, disposed in the gap between the upper cover plate 14 and the lower cover plate 15, is divided into four bags that are each substantially square in planar shape. In FIG. 2(a), a space 21 is provided between the right and left water bags 16, and a space 22 is provided between the upper and lower water bags 16.

The upper cover plate 14 has a plurality of opening holes 17 formed to pass through the surface and back surface of the upper cover plate 14. The opening holes 17 are formed to be arranged, in particular, in the vicinity of the peripheral edge of the upper cover plate 14, and the space 21 and the space 22. Likewise, as shown in FIGS. 2(a) and 2(b), the lower cover plate 15 has a plurality of opening holes 23 formed, the plurality of opening holes 23 is formed to be arranged, in particular, in the vicinity of the peripheral edge of the lower cover plate 15, and the space 21 and the space 22.

In addition, as shown in FIG. 2(b), the water bag 16 is disposed to be located above the secondary batteries 11 when the lid 13 for a cell tray is put over the secondary batteries 11 housed in the cell tray 12 in which the batteries are housed. In addition, as shown in FIGS. 2(b) and 2(d), the spaces 21 and 22 are provided between the water bags 16 and the water bags 16, and as viewed from the top surface of the lid 13 for a cell tray, the water bags 16 are arranged so as to cover a part of each of the batteries 11 for all of the batteries 11. Furthermore, as shown in FIGS. 2(b) and 2(c), the water bag 16 according to the present embodiment are sandwiched between the upper cover plate 14 and the lower cover plate 15, and as an example, fixed with eyelets 24 set in the vicinity of the side edge of the lid 13 for a cell tray on the side of the water bag 16 and between the water bag 16 and the water bag 16. It is to be noted that there is no need for the water bag 16 to be fixed with the eyelet 24. As another method for fixing the water bag 16, for example, the water bag 16 may be integrated with the upper cover plate 14 and the lower cover plate 15 with an adhesive, a double-sided tape, or the like. In addition, the water bag 16 may be housed inside a frame-shaped member, and the upper cover plate 14 and the lower cover plate 15 and the frame-shaped member may be fixed with a bolt and then integrated.

The materials of the upper cover plate 14 and lower cover plate 15 according to the present embodiment include aluminum or an aluminum alloy. In addition, the materials of the upper cover plate 14 and lower cover plate 15 may be metals, inorganic materials, metal oxides, glass, or composites thereof, or materials including mica (mica). Furthermore, according to the present embodiment, an aluminum laminate film is used for the water bag 16 which is a package for packing the water W. For example, the aluminum laminate film is composed of a heat-sealed layer, an aluminum foil, and a protective layer in order from the inside. An adhesive layer or a colored layer may further be interposed between the respective layers. A mat layer or a printing layer may be added to the further outer side of the protective layer. For example, polypropylene or polyethylene can be used for the heat-sealed layer. For example, nylon, polyethylene terephthalate, or the like can be used for the protective layer. Such an aluminum laminated film is excellent in performance of sealing water by thermal fusion bonding after containing water therein. It is also possible to apply other metal foils such as stainless steel foil and copper foil in place of the aluminum foil. The materials of the upper cover plate 14, the lower cover plate 15, and the water bag 16 are not limited to the above-mentioned materials, and may be any material as long as holes are easily made when the material is heated with fire. The thickness of the aluminum laminate film is preferably 50 µm to 300 µm. In a case in which the thickness is smaller than 50 µm, there is a possibility that holes may be easily made when foreign matters come into contact with the film from the outside of the water bag 16, and in a case in which the thickness is larger than 300 µm, holes may fail to be made even when the film is heated, thereby failing to achieve prompt fire extinguishment.

The upper cover plate 14 and the lower cover plate 15 according to the present embodiment are each preferably 0.5 mm to 1.5 mm in average thickness. The average thickness of the lid 13 for a cell tray as a whole is preferably 4 mm to 10 mm. In this regard, as shown in FIG. 2(c), the water bag 16 according to the present embodiment is sandwiched between the upper cover plate 14 and the lower cover plate 15, and fixed with the eyelet 24 set, but there may be only one cover plate adopted, and in this case, as long as the water bag 16 is disposed above a part of the cover plate covering the secondary batteries 11, there is no need for the shape of the cover to be a plate shape. Furthermore, the fire extinguishment liquid is not limited to water W, and may be any liquid as long as the liquid can quickly digest the fire source when the secondary battery 11 is ignited.

The average opening area per one opening hole of the pluralities of opening holes 17 and 23 according to the present embodiment is preferably 12.56 mm to 50.24 mm$^2$. In addition, the opening ratio of the upper cover plate 14 and the lower cover plate 15 is preferably 1.5 to 6.0%. In this regard, the "opening ratio" refers to the ratio of the total area of the pluralities of opening holes 17 and 23 in the cover plate to the surface area of one cover plate (total opening hole area/cover plate surface area×100%).

In addition, the weight of the fire extinguishing liquid per cover surface area of one lid for a cell tray is preferably 200 to 800 g/m$^2$. According to the present embodiment, the total weight of the water W packed in the four water bags 16 provided in one lid 13 for a cell tray is preferably 200 to 800 g/m$^2$. Thus, a required amount of water W can be discharged to only the secondary batteries 11 in a heat-generating region, among the secondary batteries 11 housed in the cell tray 12. In addition, considering the process for manufacturing the water bag 16 and the subsequent process for assembling the lid 13 for a cell tray, the big heavy water bag 16 is inferior in handling, which can be avoided by dividing the water bag 16. Thus, it becomes possible to introduce mass production of the secondary battery 11, and is also becomes unnecessary to make an investment in a large manufacturing apparatus for manufacturing the water bag 16 for a large amount of water. Furthermore, as viewed from the top surface of the lid 13 for a cell tray, the water bags 16 are arranged so as to cover a part of each of the batteries 11 for all of the batteries 11, thereby making it possible to, even when any of the batteries 11 generates heat or ignites, discharge water W from the water bag 16 for fire extinguishment. It is to be noted that according to the present embodiment, the water bag 16 is divided into four per lid 13 for a cell tray, and it is appropriate to divide the water bag 16 into four for the cell tray 12 housing 256 secondary batteries 11, because if the water bag 16 is divided into fine parts, such as 16 parts, 32 parts, or the like, a complicated structure is required for fixing in order to prevent the water bag 16 from being moved.

Next, a method for manufacturing the secondary battery 11 with the lid-attached cell tray 10 according to the present embodiment will be described.

First, the secondary battery 11 is assembled by a conventional technique with the use of an exterior can, a positive electrode terminal, an electrolyte, a negative electrode terminal, and the like. Next, the assembled secondary battery 11 is housed in the cell tray 12. Next, the housed secondary battery 11 is charged.

The water bag 16 is disposed in the gap between the upper cover plate 14 and the lower cover plate 15 to form the lid 13 for a cell tray, and the lid 13 for a cell tray is put over the battery housed in the cell tray 12, thereby assembling the lid-attached cell tray 10.

Further, if necessary, for example, the water bag 16 is fixed with eyelets 24 set in the vicinity of the side edge of the lid 13 for a cell tray on the side of the water bag 16 and between the water bag 16 and the water bag 16.

Next, an aging test is carried out with the use of the lid-attached cell tray 10 with the fully charged secondary battery 11 housed therein. Although extremely rare in a special test condition, in a case in which the secondary battery 11 housed in the cell tray 12 is ignited, the fire is extinguished with water W in the water bag 16 disposed over the ignited secondary battery 11.

Thereafter, the voltage, the impedance, the temperature, and the like are measured, and in the case of a secondary battery 11 determined to be a defective product, this battery 11 is removed, whereas in the case of a normal secondary battery 11, the battery 11 is discharged, and then positioned as a finished product.

Figure 3:
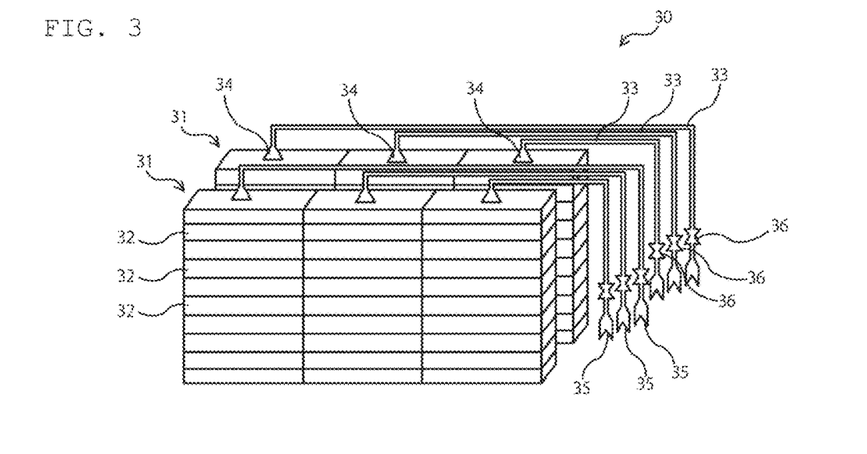
FIG. 3 is a schematic diagram illustrating an aging rack with a lid-attached cell tray according to an embodiment of the present technology.
Figure 4:
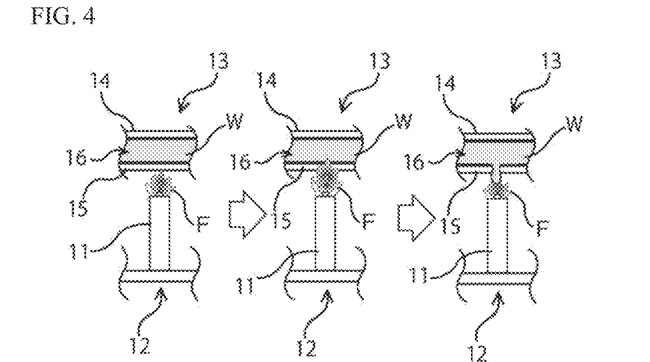
FIG. 4 is a conceptual diagram illustrating an extinguishing action by the lid for a cell tray according to an embodiment of the present technology.

FIG. 3 is a schematic diagram illustrating a sprinkler system in a case in which a battery in a lid-attached cell tray is ignited. FIG. 4 is a conceptual diagram illustrating the extinguishing action by the lid for a cell tray according to the present embodiment. An example of a fire extinguishing method with the lid for a cell tray will be described with reference to FIGS. 3 and 4.

As shown in FIG. 3, a plurality of aging racks 31 is installed in the sprinkler system 30 in order to carry out an aging test before product shipment of the secondary battery 11. In each aging rack 31, a plurality of cell tray housing cases 32 housing a plurality of lid-attached cell trays 10 is stacked for a number of layers. In addition, each aging rack 31 is provided with a hose 33 for sprinkling at the time of ignition. The hose 33 for sprinkling has a shower head 34 at an end, a fire hydrant base 35 connected to the fire hydrant hose at the rear end, and a gate valve 36 near the fire hydrant base 35. The shower head 34 is disposed in a position capable of sprinkling from above each aging rack 31. Further, as an example, the amount of water that can be discharged per system is 270 L/min, and the amount of water that can be discharged per shower head 34 is 25 L/min.

In the present embodiment, a case in which the durability test on the secondary battery 11 housed in the lid-attached cell tray 10 is performed with the use of the aging rack 31 will be described as an example.

As shown in FIG. 4, in a case in which the secondary battery 11 generates heat or the secondary battery 11 ignites due to a special test condition, for example, a flame F caused from the positive electrode surface of the secondary battery 11 reaches the lower cover plate 15 of the lid 13 for a cell tray, located above the flame F. Thereafter, when the flame F rages on, the lower cover plate 15 is heated to make a hole therein, and furthermore, the water bag 16 disposed on the top of the lower cover plate 15 is also heated to make a hole therein.

Then, the water W is discharged from the water bag 16, and discharged to the flame F through the hole of the lower cover plate 15 to extinguish the flame F which is the fire source.

If it is difficult to extinguish the fire with the water W alone due to the flame F raging on, the gate valve 36 near the fire hydrant base 35 at the rear end of the hose 33 for sprinkling, shown in FIG. 3, is opened to sprinkle water from the shower head 34 at the end of the hose 33 for sprinkling to the area where the flame F, which is the fire source, is caused. Thus, the flame F is extinguished to prevent fire spreading.

As just described, according to the present embodiment, in the process of manufacturing the secondary battery 11 such as a lithium ion battery, in particular, in the charging step or inspecting step after completion of the battery assembling step, in a case in which the battery generates heat or causes thermal runaway from any cause, the water W enclosed in the water bag 16 of the lid 13 for a cell tray is discharged to drop through the opening (through) hole, thereby making it possible to rapidly cool the secondary battery 11, and extinguish the fire source. Thus, the heat transfer from the fire source to the surroundings can be promptly suppressed, thereby effectively preventing the secondary batteries around the fire source from catching fire. Furthermore, the water discharged from the hose 33 for sprinkling drops through the opening (through) holes 17 and 23 of the upper cover plate 14 and lower cover plate 15, thus making it possible to effectively extinguish the fire. Furthermore, in a case in which the upper cover plate 14 and the lower cover plate 15 are structural bodies with flame-retardant material plates, such as metal plates, even if the flame F is caused from the secondary battery 11 by any chance, the upper cover plate 14 and the lower cover plate 15 function as fire walls, thereby making it possible to prevent fire from being caught, because of the synergistic effect with the fire extinguishing function mentioned above.

Figure 5:
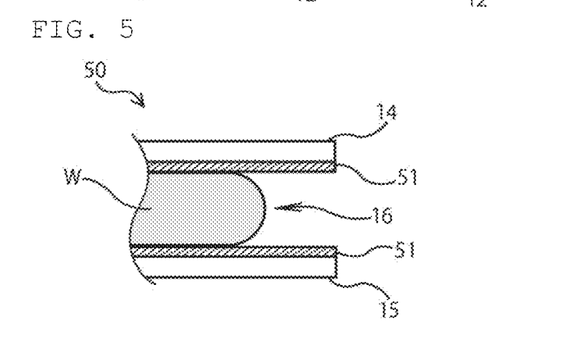
FIG. 5 is an enlarged schematic diagram illustrating a modified example of the lid for a cell tray according to an embodiment of the present technology.

FIG. 5 is an enlarged schematic diagram illustrating a modified example of the lid for a cell tray according to the first embodiment of the present technology. A lid 50 for a cell tray, which is a modified example of the lid 13 for a cell tray, will be described with reference to FIG. 5. The lid 50 for a cell tray differs from the lid 13 for a cell tray in that a nonwoven fabric layer is provided between the water bags 16 and the upper cover plate 14 and lower cover plate 15.

The lid 50 for a cell tray includes a nonwoven fabric layer 51 between the water bag 16 and the upper cover plate 14. Likewise, the lid 50 for a cell tray includes a nonwoven fabric layer 51 between the water bag 16 and the lower cover plate 15.

As just described, the lid 50 for a cell tray includes the nonwoven fabric layer 51, thereby making it possible to absorb and retain water when water is discharged from the outside such as the shower head 34, and thus fulfills a function as a fire wall for suppressing the heat transfer from a fire source to the surrounding, thereby making it possible to prevent the other batteries from catching fire more effectively than the lid 13 for a cell tray. In addition, the lid 50 for a cell tray has the water bag 16 wrapped with the nonwoven fabric layers 51, thereby making it possible to prevent the water bag 16 from being rubbed, scratched, perforated, and the like. It is to be noted that the nonwoven fabric layer 51 may be provided on the surface of the water bag 16.

According to the present embodiment, the lid 50 for a cell tray includes the nonwoven fabric layer 51, but without limitation to the nonwoven fabric layer, may include any material layer as long as the layer serves as any of a water retention layer, a water absorption layer, and an aqueous layer. For example, the water retention layer, the water absorption layer, and the aqueous layer may be layers including at least one of a woven fabric, a sponge, a foam, a sponge, paper, and a high molecular weight polymer.

Figures 6, 6C:
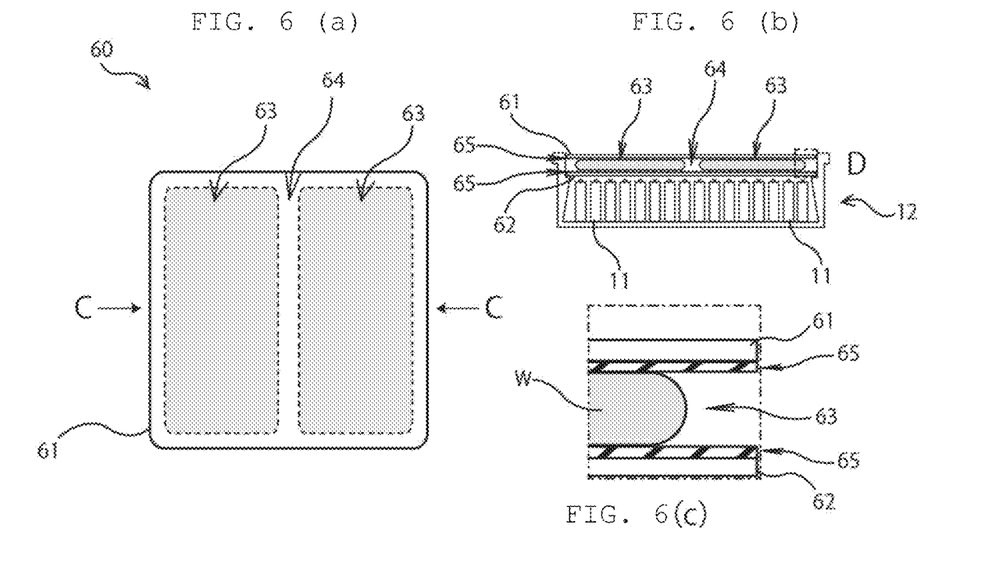
FIG. 6(c) is an enlarged view of an end of the lid.

FIG. 6 is a schematic diagram illustrating a configuration example of a lid 60 for a cell tray according to the second embodiment of the present technology.

FIG. 6(*a*) is a plan view of the lid 60 for a cell tray, FIG. 6(*b*) is a cross-sectional view of a cell tray 12 and the lid 60 for a cell tray along the line C-C, and FIG. 6(*c*) is an enlarged view of an end of the lid 60 for a cell tray in a frame D. A configuration example of the lid 60 for a cell tray will be described with reference to FIGS. 6(*a*) to (*c*).

As shown in FIGS. 6(*a*) and 6(*b*), a water bag 63 containing water W which is a fire extinguishing liquid for extinguishing a fire source, disposed in the gap between an upper cover plate 61 and a lower cover plate 62, is divided into two bags that are each vertically long and substantially rectangular in planar shape. In FIG. 6(*a*), a gap 64 is provided between the right and left water bags 63.

As shown in FIG. 6(*b*), the water bag 63 is disposed to be located above the secondary batteries 11 when the lid 60 for a cell tray is put over the cell tray 12 in which secondary batteries 11 are housed. In addition, as shown in FIGS. 6(*b*) and 6(*c*), the lid 60 for a cell tray includes a sponge layer 65 including a polymer between the water bag 63 and the upper cover plate 61 and between the water bag 63 and the lower cover plate 62.

The lid 60 for a cell tray according to the present embodiment includes the sponge layer 65 including the polymer, and thus, even when the water bag 63 is divided into two in one lid 60 for a cell tray, as in the modified example of the first embodiment, the sponge layer 65 fulfills a function as a fire wall for suppressing the heat transfer from a fire source to the surrounding, thereby making it possible to effectively prevent the other batteries from catching fire. In addition, the lid 60 for a cell tray has the water bag 63 wrapped with the sponge layers 65, thereby making it possible to prevent the water bag 63 from being rubbed, scratched, perforated, and the like.

Figure 7:
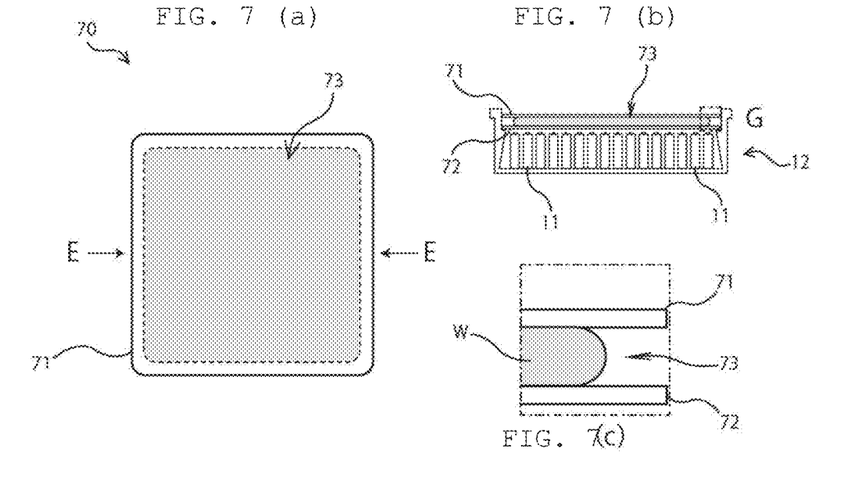
FIG. 7(a) is a plan view of the lid.
FIG. 7(b) is a cross-sectional view of the lid.
FIG. 7(c) is an enlarged view of an end of the lid.

FIG. 7 is a schematic diagram illustrating a configuration example of a lid 70 for a cell tray according to the third embodiment of the present technology. FIG. 7(*a*) is a plan view of the lid 70 for a cell tray, FIG. 7(*b*) is a cross-sectional view of a cell tray 12 and the lid 70 for a cell tray along the line E-E, and FIG. 7(c) is an enlarged view of an end of the lid 70 for a cell tray in a frame G. A configuration example of the lid 70 for a cell tray be described with reference to FIGS. 7(a) to (c).

As shown in FIGS. 7(a) and 7(b), a water bag 73 containing water W which is a fire extinguishing liquid for extinguishing a fire source, disposed in the gap between an upper cover plate 71 and a lower cover plate 72, is formed to be substantially square in planar shape and about the same size as the sizes of the surfaces of the upper cover plate 71 and lower cover plate 72.

As shown in FIG. 7(b), the water bag 73 is disposed to be located above the secondary batteries 11 when the lid 70 for a cell tray is put over the cell tray 12 in which secondary batteries 11 are housed. In addition, as shown in FIGS. 7(b) and 7(c), the lid 70 for a cell tray is fixed in such a way that the water bag 73 is sandwiched between the upper cover plate 71 and the lower cover plate 72.

Also in the case of the lid 70 for a cell tray according to the present embodiment, the water bag 73 is disposed above the secondary batteries 11, and thus, as in the first embodiment, in a case in which the battery generates heat or causes thermal runaway from any cause, the water W enclosed in the water bag 73 of the lid 70 for a cell tray is discharged to drop through the opening (through) hole, thereby making it possible to rapidly cool the secondary battery 11, and extinguish the fire source. Thus, the heat transfer from the fire source to the surroundings can be promptly suppressed, thereby effectively preventing the secondary batteries around the fire source from catching fire.

As described below, lids for cell trays according to various examples of the present technology were manufactured for verifying whether fire was caught according to the present examples and comparative examples.

Ten sets of cell trays housing 256 fully charged cylindrical batteries (18650 size) were prepared and stacked. One battery in the center of the fifth cell tray from the bottom was forcibly brought externally into an overcharge condition, and further forcibly short-circuited for heat generation and ignition. Thereafter, the time taken to extinguish the fire was measured. Additionally, after the fire extinguishment, the number of batteries that had caught fire was counted.

According to the present examples, eight types of lids for cell trays were prepared with the use of cover plates made of an aluminum alloy with a thickness of 0.8 mm. Example 1 is configured to have four divided water bags sandwiched between two cover plates with a plurality of opening holes (see FIG. 2). Example 2 is configured to have four divided water bags sandwiched between two cover plates with a plurality of opening holes, and include nonwoven fabric layers between the respective cover plates and the water bags (see FIG. 5). Example 3 is configured to have four divided water bags sandwiched between two cover plates with a plurality of opening holes, and include sponge layers including a polymer between the respective cover plates and the water bags (see FIGS. 2 and 6).

Example 4 is configured to have two divided water bags sandwiched between two cover plates without opening holes (see FIG. 6(a)). Example 5 is configured to have one water bag sandwiched between two cover plates without opening holes (see FIG. 7). Example 6 is configured to have four divided water bags sandwiched between two cover plates without opening holes, and include nonwoven fabric layers between the respective cover plates and the water bags. Example 7 is configured to have two divided water bags sandwiched between two cover plates without opening holes, and include sponge layers including a high molecular weight polymer between the respective cover plates and the water bags.

In this experiment, five types of comparative examples were prepared. Comparative Example 1 is configured to have no cover plate without using any lid for a cell tray. Comparative Example 2 is configured to have one cover plate made of mica. Comparative Example 3 is configured to have two cover plates made of mica. Comparative Example 4 is configured to have one cover plate made of aluminum with a thickness of 0.8 mm. Comparative Example 5 is configured to have one cover plate made of stainless steel with a thickness of 0.5 mm.

Figure 8:
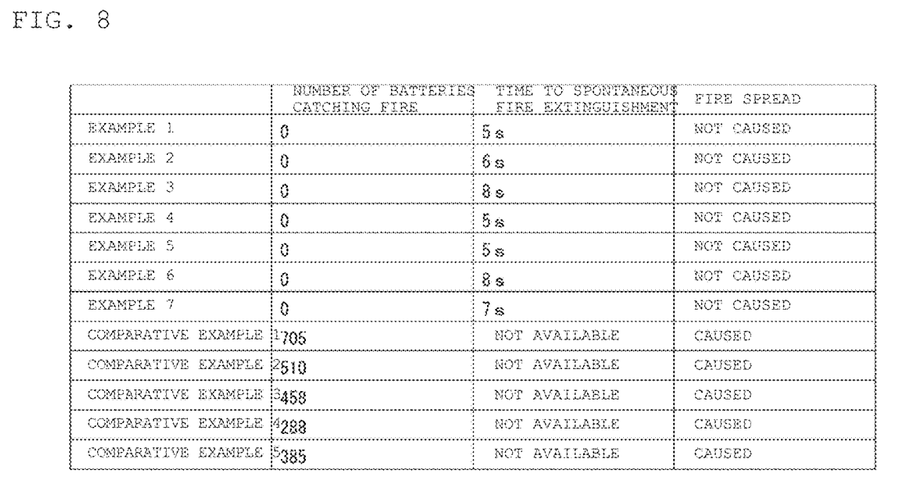
FIG. 8 is a diagram showing experimental results of ignition and fire spread of batteries with lid-attached cell trays according to an embodiment of the present technology.

FIG. 8 is a diagram showing experimental results of ignition and fire spread of batteries with lid-attached cell trays according to the present technology. As shown in FIG. 8, it has been determined that with the configuration including the water bag, regardless of the presence or absence of the opening holes of the cover plates and the presence or absence of divided water bags, the use of the lids for cell trays according to Examples 1 to 7 can achieve spontaneous fire extinguishment in a short period of time, and also prevent fire spreading.

On the other hand, it has been determined that the configurations according to Comparative Examples 1 to 5 fail to achieve spontaneous fire extinguishment, thereby causing fire spreading.

Experiments were conducted to examine the relation between the amount of water in the water bag provided in the lid for a cell tray according to Example 2 of the present technology, and the fire extinguishment time and the battery temperature as follows.

Figure 9:
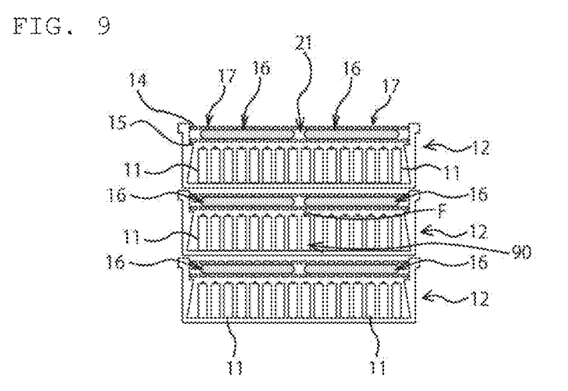
FIG. 9 is a diagram illustrating a fire extinguishing experiment with the use of lid-attached cell trays according to an embodiment of the present technology.

As shown in FIG. 9, three sets of lid-attached cell trays 10 housing 256 fully charged cylindrical batteries 11 (18650 size) were prepared and stacked. One battery 90 in the center of the second cell tray 12 from the bottom was forcibly brought externally into an overcharge condition, and further forcibly short-circuited for heat generation and ignition. Thereafter, the amount of water was changed with respect to the lid 13 for a cell tray according to Example 2 to measure the time taken to extinguish the fire and the surface temperature (Max) of the battery side surface. In addition, after the fire extinguishment, the number of batteries that had caught fire was counted. It is to be noted that the amount of water is the weight ($g/m^2$) of water sealed in the water bag per unit area of the cover plates 14 and 15. Used were the cover plates 14 and 15 of size 0.48 m×0.48 m.

Figure 10:
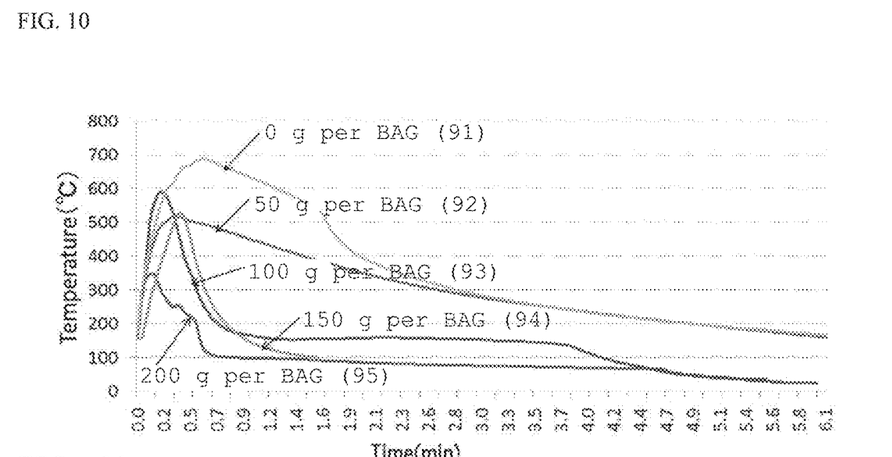
FIG. 10 is a graph showing the relation between time and battery temperature for the amount of water stored in the lid for a cell tray according to an embodiment of the present technology.

FIG. 10 is a graph showing the relation between time and battery temperature for the amount of water stored in the lid for a cell tray according to the present technology. A curve 91 represents a case without any water bag, that is, the amount of water is 0 ml. A curve 92 represents a case in which the amount of water per water bag is 50 g, that is, 868 ($g/m^2$). A curve 93 represents a case in which the amount of water per water bag is 100 g, that is, 1736 ($g/m^2$). A curve 94 represents a case in which the amount of water per water bag is 150 g, that is, 2604 ($g/m^2$). A curve 95 represents a case in which the amount of water per water bag is 200 g, that is, 3472 ($g/m^2$).

Figure 11:
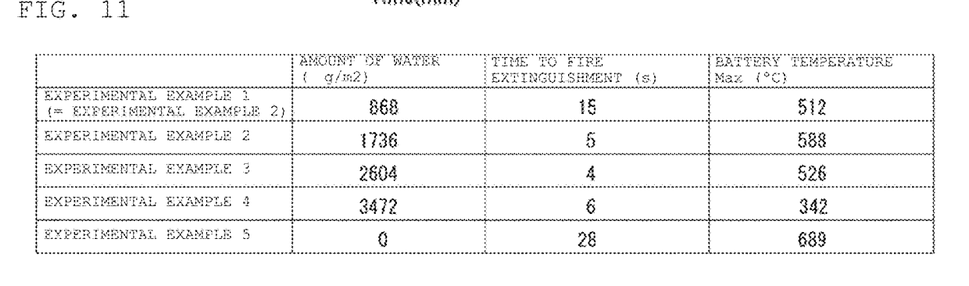
FIG. 11 is a diagram of experimental results that show the relation between fire extinguishing time and battery temperature for the amount of water stored in the lid for a cell tray according to an embodiment of the present technology.

FIG. 11 is a diagram of experimental results that show the relation between fire extinguishing time and battery temperature for the amount of water stored in the lid for a cell tray according to the present technology. As shown in FIG. 11, it has been determined that if the amount of water sealed per water bag included in the lid for a cell tray is excessively small, such as less than 100 g, it takes time to extinguish the fire, because of a long period of time to decrease the temperature of the ignited battery or the like.

On the other hand, if the amount of water sealed per water bag included in the lid for a cell tray is excessively large, such as 200 g or more, water will be excessively scattered around the ignited battery or the like, thereby watering the battery more than necessary. Further, the battery watered once is subject to disposal, the amount of water per water bag is preferably 200 g or less.

Accordingly, from the present experimental result, it has been determined that the amount of water sealed in the water bag included in the lid for a cell tray preferably falls within the range of 868 to 3472 g/m² per unit area of the cover plate, because fire extinguishment can be quickly achieved.

It should be understood that embodiments according to the present technology are not to be considered limited to the above-described embodiments, and various modifications can be made without departing from the scope of the present technology.

In addition, the effects described in this description are merely considered by way of example, and not to be considered limited, and there may be other effects.

The present technology is described below in further detail according to an embodiment.

[1]
A lid for a cell tray, including:
a cover that covers a battery housed in a cell tray; and
a fire extinguishing liquid.

[2]
The lid for a cell tray according to [1], where the cover is a plate-shaped cover plate with a gap, and the fire extinguishing liquid is disposed in the gap.

[3]
The lid for a cell tray according to [2], where the cover plate has a plurality of opening holes.

[4]
The lid for a cell tray according to [3], where the cover plate is substantially rectangular in planar shape, and
the liquid is sealed in a package, and the package is divided into four.

[5]
The lid for a cell tray according to [4], where the package is an aluminum laminate film.

[6]
The lid for a cell tray according to [3], where the average opening area per one opening hole of the plurality of opening holes is 12.56 to 50.24 mm².

[7]
The lid for a cell tray according to [3], where the cover plate has an opening ratio of 1.5 to 6%.

[8]
The lid for a cell tray according to [2], where the material of the cover plate is a metal, an inorganic matter, a metal oxide, glass, or a composite thereof.

[9]
The lid for a cell tray according to [2], where the material of the cover plate includes aluminum or an aluminum alloy.

[10]
The lid for a cell tray according to [2], where the material of the cover plate includes mica (mica).

[11]
The lid for a cell tray according to [1], where the lid for a cell tray is 4 to 10 mm in average thickness.

[12]
The lid for a cell tray according to [2], where the cover plate is 0.5 to 1.5 mm in average thickness.

[13]
The lid for a cell tray according to [1], where the weight of the fire extinguishing liquid per unit area of the cover plate is 868 to 3472 g/m².

[14]
A lid-attached cell tray including:
a cell tray that houses a plurality of batteries; and
a lid for a cell tray, including a cover that covers the batteries housed in the cell tray, and a fire extinguishing liquid.

[15]
A method for manufacturing a battery, including the steps of:
assembling a battery;
housing the battery in a cell tray;
charging and discharging the battery;
covering the battery housed in the cell tray, with a lid for a cell tray, the lid including a cover that covers the battery housed in the cell tray, and a fire extinguishing liquid; and
when a battery housed in the cell tray is ignited, extinguishing a fire with the fire extinguishing liquid disposed above the ignited battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lid for a cell tray, comprising:
a cover which is configured to cover a battery accommodated in a cell tray;
and the cover includes upper and lower plate-shaped cover plates with a gap therebetween; and
a fire extinguishing liquid configured to be disposed in the gap,
wherein the fire extinguishing liquid is sealed in a package and disposed to be located above the battery when the cover is put over the battery accommodated in the cell tray, and
wherein the upper and lower plate-shaped cover plates include a plurality of opening holes.

2. The lid for a cell tray according to claim 1, wherein the cover plate is substantially rectangular in planar shape, and
the fire extinguishing liquid is configured to be sealed in a package.

3. The lid for a cell tray according to claim 2, wherein the package includes an aluminum laminate film.

4. The lid for a cell tray according to claim 1, wherein an average opening area per one opening hole of the plurality of opening holes is from 12.56 to 50.24 mm².

5. The lid for a cell tray according to claim 1, wherein the cover plate has an opening ratio of 1.5% to 6%.

6. The lid for a cell tray according to claim 1, wherein a material of the cover plate includes a metal, an inorganic matter, a metal oxide, glass, or a composite thereof.

7. The lid for a cell tray according to claim 1, wherein the material of the cover plate includes aluminum or an aluminum alloy.

8. The lid for a cell tray according to claim 1, wherein the material of the cover plate includes mica.

9. The lid for a cell tray according to claim 1, wherein the lid has an average thickness from 4 mm to 10 mm.

10. The lid for a cell tray according to claim 1, wherein the cover plate has an average thickness from 0.5 mm to 1.5 mm.

11. The lid for a cell tray according to claim 1, wherein a weight of the fire extinguishing liquid per unit area of the cover plate is from 868 g/m² to 3472 g/m².

12. The lid for a cell tray according to claim 1, wherein the fire extinguishing liquid is configured to be sealed in four packages.

13. The lid according to claim 1, wherein the battery includes one or more secondary batteries.

14. A lid-attached cell tray comprising:
  a cell tray configured to accommodate a plurality of batteries; and
  a lid for the cell tray including a cover which is configured to cover the batteries accommodated in the cell tray and the cover includes upper and lower plate-shaped cover plates with a gap herebetween, and a fire extinguishing liquid configured to be disposed in the gap,
  wherein the fire extinguish liquid is sealed in a package and disposed to be located above the batteries when the lid is put over the batteries accommodated in the cell tray, and
  wherein the upper and lower plate-shaped cover plates include a plurality of opening holes.

15. The lid-attached cell tray according to claim 14, wherein the batteries include a plurality of secondary batteries.

16. A method for manufacturing a battery, the method comprising the steps of:
  assembling the battery;
  accommodating the battery in a cell tray;
  charging and discharging the battery;
  covering the battery accommodated in the cell tray with a lid for the cell tray, wherein the lid includes a cover which is configured to cover the battery accommodated in the cell tray and the cover includes upper and lower plate-shaped cover plates with a gap therebetween, and a fire extinguishing liquid configured to be disposed in the gap, wherein the fire extinguish liquid is sealed in a package and disposed to be located above the battery when the lid is put over the battery accommodated in the cell tray, and wherein the upper and lower plate-shaped cover plates include a plurality of opening holes; and
  in a case that the battery accommodated in the cell tray is ignited, the fire extinguishing liquid is released to the ignited battery.

17. The method according to claim 16, wherein the battery includes one or more secondary batteries.

* * * * *